United States Patent Office 3,595,804
Patented July 27, 1971

---

3,595,804
METHOD FOR PREPARING ZINC AND ZINC-CADMIUM SULFIDE PHOSPHORS
Joseph S. Martin, Jr., Lancaster, Pa., assignor to RCA Corporation
No Drawing. Filed Oct. 30, 1968, Ser. No. 771,984
Int. Cl. C09k 1/12
U.S. Cl. 252—301.6S          5 Claims

ABSTRACT OF THE DISCLOSURE

A method for preparing zinc and zinc-cadmium sulfide phosphors including placing in a covered container a mixture of zinc sulfide or zinc-cadmium sulfide, an activator quantity of copper or silver as a compound thereof, an activator quantity of aluminum as a compound thereof, a minor proportion of sulfur and a minor proportion of carbon. The mixture is heated to its reaction temperature and then cooled. After cooling, whatever carbon remains is removed as by screening the batch through a screen.

BACKGROUND OF THE INVENTION

The present invention relates to a novel technique for preparing zinc sulfide and zinc-cadmium sulfide phosphors activated with silver or copper and containing aluminum.

It is known that many luminescent materials may be prepared by incorporating minor amounts of metallic activator, such as silver or copper into zinc sulfide or zinc-cadmium sulfide host material. Moreover, a coactivator such as a halogen or aluminum, either one termed a compensator, is also incorporated. When heated at elevated temperatures, these activators and compensators enter the crystal lattice of the host material and are responsible for imparting the luminescent properties to the material.

U.S. Patent No. 2,623,858 to F. A. Kroger, discloses methods for preparing copper or silver activated zinc and zinc-cadmium sulfide phosphors which contain also aluminum. When one considers the incorporation of aluminum into a sulfide host crystal, various complexities are evident. Incorporation is usually accomplished by heating the activated raw host material in an atmosphere of flowing hydrogen sulfide. It has been observed, however, that particle size growth occurs in this environment, producing particles which are undesirably large for use in luminescent screens for television picture tubes. In addition, the restriction of such an atmospheric medium requires extensive inert gas pre- and post-flushing operations thereby reducing the overall efficiency of a phosphor manufacturing process.

SUMMARY OF THE INVENTION

The novel process includes placing in a covered container a mixture of zinc sulfide or zinc-cadmium sulfide together with activator quantities of aluminum and either copper or silver and minor proportions of both sulfur and carbon; heating the mixture at its reaction temperature; and then removing any excess carbon remaining in the reaction product.

By including a combination of sulfur and carbon in the batch during the heating step, the particle size of the product may be reduced to a range which is desirable for use in producing luminescent screens for television picture tubes. The chemical and physical properties of the phosphor product are otherwise adapted for use in producing television screens.

DESCRIPTION OF THE PREFERRED EMBODIMENTS

Example 1

To 200 grams of zinc sulfide particles suspended in water are added 0.015 weight percent silver as the nitrate and 0.015 weight percent aluminum as the nitrate. The mixture is dried and the dry mixture sieved. About 2 weight percent of powdered sulfur and about 5 weight percent of coconut carbon granules (2–8 mesh particle size) are randomly distributed in the mass. The preferred coconut carbon granules are activated carbon PCB4X10 marketed by Pittsburgh Activated Charcoal Co., Pittsburgh, Pa. The above mixture is placed in a quartz beaker, covered with a lid, and this assembly enclosed within another beaker also covered with a lid. The entire assembly is heated at about 1150° C. for about 30 minutes. The charge when cooled is sieved through a 12-mesh screen and then a 60-mesh screen to remove any remaining carbon granules. Finally, the product is sieved through a 400-mesh screen.

The product is a silver-activated zinc sulfide containing incorporated aluminum having the formula

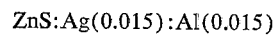

$$ZnS:Ag(0.015):Al(0.015)$$

based on the formulation of the raw batch. The product is both photoluminescent and cathodoluminescent emitting a visually blue luminescence upon excitation. When compared with a commercially-used silver-activated zinc sulfide having a halide compensator, the novel phosphor had 110 percent peak efficiency, 132 percent visual efficiency and a median particle size of about 10 microns.

Example 2

To an aqueous slurry of 160 grams of a combined zinc sulfide and cadmium sulfide preparation (92.1 weight percent ZnS and 7.9 weight percent CdS) are added 0.006 weight percent copper as a nitrate and 0.006 weight percent aluminum as a nitrate. The mixture is dried and then mixed with 5 weight percent of elemental sulfur and 1 weight percent of carbon particles having an 8-mesh particle size. The preferred carbon particles are carbon #23251 marketed by Consolidated Electronics Corp., Pasadena, Calif. The mixture is placed in a quartz beaker and covered and then heated at about 1150° C. for about 30 minutes. The product is cooled and then sieved through a 60-mesh stainless steel screen to remove any excess carbon particles. The product is a copper activated zinc-cadmium sulfide containing incorporated aluminum and having the formula

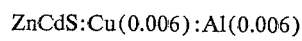

$$ZnCdS:Cu(0.006):Al(0.006)$$

based on the formulation of the raw batch. The reaction product is both photoluminescent and cathodoluminescent producing a green luminescence. The product has a mean particle size of about 11.5 microns.

Example 3

Follow the procedure of Example 2 except substitute 5 weight percent of carbon balls for the 1 weight percent of carbon granules. The preferred carbon balls are Spears ¼ inch Carbon Balls marketed by Spear Carbon Co., St. Marys, Pa.

GENERAL CONSIDERATIONS

The novel method incorporates aluminum into sulfide type phosphors using a combination of elemental carbon and sulfur intimately mixed with the activated host material. In this manner, production quantities of zinc sulfide or zinc-cadmium sulfide activated with copper and aluminum or with silver and aluminum may be prepared in suitably large batches which have smaller and therefore more useful particle sizes.

While the formation of aluminum sulfide is presumed to be the chemical form of the aluminum which is incorporated in such phosphors, the identification of this compound by analysis has not completely proven this presumption. At present, it is not known just how the use of carbon and sulfur produces a reaction product with smaller particle sizes than was produced by previous processes. One theory is that a reaction proceeds through the in situ formation of carbon disulfide and/or other organic sulfides.

It is known that the shape and form of the carbon which is used in the novel process vastly influence the efficiency of the reaction product. Carbon powder in the versions known as "gas black," bone black, various decolorizing charcoals, etc. has been successful, but the resultant phosphor was contaminated with finely divided carbon particles which had the effect of absorbing a portion of the luminescence from the material. It is believed that it is difficult to provide exactly the quantity of carbon required for the reaction and yet avoid leaving a residue of finely divided carbon particles which reduces the luminescent usability of the material.

One form of carbon which has produced preferred results is a granular type, originating from bitumen and coconut sources. Another desirable form of carbon for practicing the invention is cylindrical pieces cut from carbon are electrodes. Still another useful form of carbon is particles in spherical form or balls. The particles of the granular form, which are irregular in geometry, offer a compromise between the greatest surface area available to promote a carbon-sulfur reaction product and an ease for subsequent removal of excess carbon particles by a sieving operation. The random dispersal of the carbon in the charge to be fired together with the uniform sulfur distribution provides the necessary atmosphere for satisfactory practice of the novel process with reduced quantities of material.

It is preferable to use carbon bodies which are greater than 10 mesh in size, although any size and any kind of carbon may be used to practice the novel method. The carbon is present in an amount between 0.1 and 10 weight percent of the host material and preferably about 0.5 to 5 weight percent. The sulfur may be present as elemental sulfur in an amount between 1.0 to 10.0 weight percent of the host material, and preferably between 2.0 and 5.0 weight percent.

The proportions of zinc sulfide, cadmium sulfide, copper, sulfur and aluminum are those which are known in the art to produce useful phosphors. Generally the activators, copper or silver, are present in an amount between 0.004 and 0.020 weight parts per hundred parts of host material. The aluminum is present preferably in an amount between 0.004 and 0.060 weight parts per hundreds parts of host. The host material is preferably zinc sulfide containing 0 to 15 weight percent cadmium sulfide.

The reaction may be carried out in any container which is essentially non-reactive with the constituents of the batch and which does not contain contaminants for the reaction product. The reaction is preferably carried out at about 1000 to 1200° C. in a period of about 0.25 to 2.0 hours. Upon cooling, the reaction product is sieved. The sieve size is chosen to pass the phosphor material and to retain excess carbon bodies which remain in the reaction product. It is preferred to use carbon bodies which are coarser than 10 mesh and to use a sieve which is 100 mesh and finer for this reason.

I claim:

1. A method for preparing a cathodoluminescent phosphor consisting essentially of zinc sulfide or zinc-cadmium sulfide activated with aluminum and a member of the group consisting of copper and silver comprising:
   (a) placing in a covered container a mixture of zinc sulfide or zinc-cadmium sulfide, an activator quantity of copper or silver as a compound thereof, an activator quantity of aluminum as a compound thereof, sulfur in an amount between 0.1 and 10.0 weight percent of said zinc sulfide and zinc-cadmium sulfide and carbon in an amount between 0.5 and 5.0 weight percent of said zinc sulfide and zinc-cadmium sulfide;
   (b) and heating the mixture to temperatures in the range of about 1000 to 1200° C. for a period of about 0.25 to 2.0 hours.

2. The method defined in claim 1 wherein said carbon is present in such an amount that upon completion of said heating step a residue of carbon particles remains in the mixture, said carbon being present in the unreacted mixture as bodies which are coarser than 10 mesh, and said remaining carbon bodies are removed by screening the reacted mixture through a screen having a mesh size that will retain said remaining carbon particles thereon.

3. The method defined in claim 2 wherein said carbon bodies are removed by screening said reacted mixture through a screen that is 100 mesh or finer whereby substantially all of said remaining carbon bodies are retained on said screen.

4. The method defined in claim 3 wherein said unreacted mixture contains 2 to 5 weight percent sulfur.

5. The method defined in claim 4 wherein said carbon is granular.

References Cited

UNITED STATES PATENTS

| | | | |
|---|---|---|---|
| 2,537,262 | 1/1951 | Ellefson | 252—301.6X |
| 2,541,384 | 2/1951 | Rothschild | 252—301.6 |
| 2,623,858 | 12/1952 | Kroger | 252—301.6 |
| 3,303,141 | 2/1967 | Jaffe | 252—301.6 |
| 3,389,089 | 6/1968 | Smith | 252—301.6 |

JAMES E. POER, Primary Examiner

J. COOPER, Assistant Examiner